June 10, 1958 — J. D. HUMPHREYS — 2,837,916
METEOROLOGICAL INSTRUMENT SHELTER
Filed Nov. 14, 1955
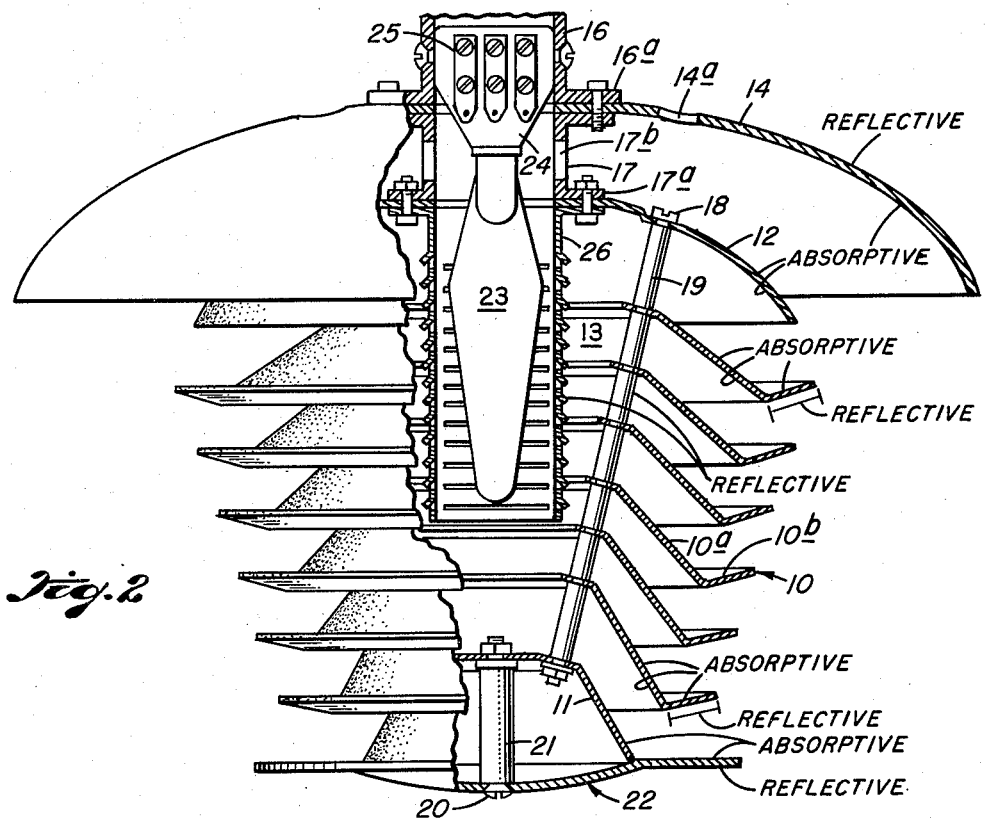
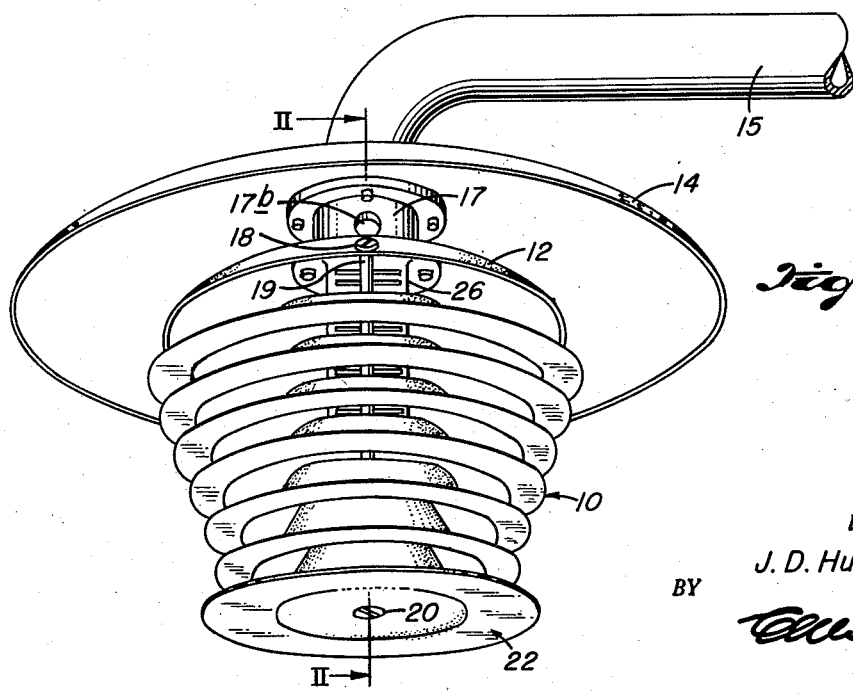
INVENTOR.
J. D. Humphreys
BY
ATTORNEY

United States Patent Office 2,837,916
Patented June 10, 1958

2,837,916

METEOROLOGICAL INSTRUMENT SHELTER

John D. Humphreys, Encino, Calif., assignor to Bendix Aviation Corporation, North Hollywood, Calif., a corporation of Delaware Application November 14, 1955, Serial No. 546,631

6 Claims. (Cl. 73—170)

This invention relates to shelters for meteorological instruments used to measure ambient air conditions, particularly temperature and conditions dependent upon temperature.

One of the chief functions of such shelters is to protect temperature-sensitive instruments from solar radiation so that they will more accurately indicate the true temperature of the ambient air. Most prior known structures function quite satisfactorily when there is some wind to change the air rapidly within the housing, but permit objectionable errors under stagnant air conditions. The best known solution for stagnant air conditions is artificial air circulation through the shelter by a fan or blower, but such systems are expensive and are undesirable for unattended instruments, such as in systems where data is automatically transmitted from remote meterological stations to a central station.

An object of the invention is to provide a shelter structure that is highly efficient in protecting instruments from solar radiation without power-induced air circulation.

Another object is to provide a structure that gives good protection against ground-reflected as well as against direct solar radiation.

Another object is to provide an efficient shelter that is relatively small and compact.

Other more specific objects and features of the invention will appear from the description to follow.

Briefly, the invention consists of a housing structure defining a central instrument chamber and including upper and lower closure elements and a series of similar annular louver elements interposed between the closure elements in vertically spaced relation to each other to permit free flow of air laterally through the chamber in response to wind, while obstructing radiant heat. To substantially reduce direct paths for ingress of radiant heat, the louver elements each consist of inner and outer frusto-conical sections extending outwardly and downwardly and outwardly and upwardly, respectively. The outer sections are relatively narrow, as compared to the inner sections, so that the air paths between the louvers extend generally inwardly and upwardly. This induces circulation of air by convection into the instrument chamber during stagnant air conditions, the air between the louvers being slightly heated by contact with the louvers, which, in turn, are heated above the temperature of the ambient air by absorption of radiant heat. The slightly heated air currents created by the convection move upwardly in the instrument chamber and escape through apertures provided therefor in the upper closure member. To minimize the heating of the chamber by radiant heat, the under sides of the outer upturned annular sections of the louvers are made highly reflective so that much of the radiant heat impinging thereon is reflected completely away from the shelter. The other surfaces of the louvers are made heat-absorptive to absorb radiant energy rather than to reflect it into the instrument chamber. The radiant heat absorbed by the louvers, of course, raises their temperature and heats the air therebetween, as previously indicated, and this air flows by convection into the instrument chamber. However, the error resulting from this action is much less than the error that would result if radiant energy were reflected directly into the instrument chamber onto the instruments therein.

A full understanding of the invention may be had from the following detailed description with reference to the drawing, in which:

Fig. 1 is a perspective view of a complete shelter in accordance with the invention.

Fig. 2 is a side elevational view of the structure with portions broken away.

The main elements of the structure shown in the drawing consist of a plurality of annular louver elements 10, a lower element 11, an upper element including a hollow bracket 17 and an outer skirt member 12, and defining a central space 13 for an instrument. An upper dome-shaped shielding wall 14 is positioned above the skirt section 12.

As best shown in Fig. 1, the structure is adapted to be supported by a tubular arm 15 extending from any convenient mounting structure. The end of the arm 15 at the point of its attachment to the shelter extends downwardly and connects to a tubular bracket 16 having an outwardly extending flange 16a at its lower end to which the dome-shaped shielding wall 14 is secured. Secured to the under side of the dome 14 and extending downwardly therefrom is the hollow bracket 17 having an outwardly extending flange 17a at its lower end to which the skirt member 12 is secured. The elements below the skirt member 12 are supported therefrom by frame means consisting of bolts 18 which extend through apertures provided therefor in all of the louvers 10 and in the lower closure member 11. Tubular spacers 19 surrounding the bolts 18 serve to separate the closure elements and the louver elements from each other in suitable spaced relation. The outer surfaces of the spacers 19 are preferably reflective, to return heat radiated thereto from the louvers 10. Positioned below the lower closure member 11 and secured thereto by a bolt 20 and separating sleeve 21 is a lower shield 22.

As shown in the drawing, the instrument housed by the structure described is a thermo-responsive electric element 23 supported from a flat support 24 which extends crosswise through the tubular bracket 16 and is provided with connecting terminals 25.

An auxiliary louvered, open-ended, heat-reflective, tubular member 26 is positioned to enclose the thermal element 23, but this structure is auxiliary to the present invention and need not always be provided.

Each of the annular louver elements 10 has an inner frusto-conical section 10a which extends outwardly and downwardly, and an outer frusto-conical section 10b that extends outwardly and upwardly, the inner section being substantially wider than the outer section.

To reflect as much radiant energy as possible completely away from the shelter, the upper surface of the shielding wall 14, the lower surfaces of the outer sections 10b of the anular louver elements 10, and the lower surface of the lower shield 22 are made highly reflective, as by using polished metal surfaces. However, any surface in a position where it might reflect radiant energy into the chamber 13 is made heat-absorptive, as by painting it black. Thus the under surface of the dome 14, both surfaces of the skirt member 12, all surfaces of the annular louver elements except the under surfaces of the sections 10b, and the upper surface of the lower shield 22 are made heat-absorptive.

The main source of radiant energy to which meterological installations are exposed is, of course, solar energy. When the sun is high, the reflective upper surface of the shielding wall 14 reflects most of the solar energy. Whether the sun is high or low, oftentimes substantial amounts of solar energy are reflected from the ground or other surfaces below the installation onto the reflective under surfaces of the sections 10b of the louver elements, and such heat is largely reflected from those surfaces. Solar radiation, whether direct or indirect, striking the structure at a low angle enters between the outer portions of the louver element 10 and impinges on the upper surface of the inner sections 10a of the louvers where it is absorbed. It is desirable to avoid reflecting such energy, because it would be reflected either onto the under surface of the louver next above and thence into the space 13 onto the instrument, or directly into the space 13 onto the instrument. The absorption of this energy by the black surfaces of the louvers 10 unavoidably heats them, but this heat affects the instruments in the chamber 13 much less than if the radiant energy were directed thereinto. The increase in temperature of the louver elements by the absorption of solar energy raises the temperature of the air therebetween. If there are appreciable wind currents, this heat will be rapidly dissipated by the lateral flow of air through the instrument between the louvers, and the temperature of the air will be raised only very slightly because of the relatively large volume of the moving air.

Under stagnant air conditions, the air between the louvers becomes heated, as previously described, and thereby becomes lighter. It tends to rise and flow in the upwardly directed paths between the louvers into the space 13. It tends to rise in the chamber and will escape therefrom if a path is provided. Such a path is provided by apertures 17b in the bracket 17 and 14a in the dome 14. The convection air currents thus produced remove the heat from the louvers 10a before their temperature can much exceed that of the ambient air. It is found that the temperature of the thermo-responsive element 23 only slightly exceeds the temperature of the ambient air under stagnant air conditions.

Although for the purpose of explaining the invention a particular embodiment thereof has been shown and described, obvious modifications will appear to a person skilled in the art, and I do not desire to be limited to the exact details shown and described.

I claim:

1. A meterological instrument shelter comprising: a plurality of generally similar annular louver elements symmetrically disposed about a common vertical axis in axially spaced relation to define ventilating passages therebetween; upper and lower elements above and below said louver elements respectively and defining with said louver elements a central space for an instrument substantially closed at the top and bottom and communicating with the ambient air through said ventilating passages; frame means mutually suporting said elements; each of said louver elements having an inner innular frusto-conical section extending outwardly and downwardly and an outer annular frusto-conical section extending outwardly and upwardly.

2. A device according to claim 1 in which the upper surfaces of both said sections and the lower surfaces of the inner section are more heat-absorptive than the lower surface of said outer section.

3. A meterological instrument shelter comprising: a plurality of general similar annular louver elements symmetrically disposed about a common vertical axis in axially spaced relation to define ventilating passages therebetween; upper and lower elements above and below said lower elements respectively defining with said louver elements a central space for an instrument substantially closed at the top and bottom and communicating with the ambient air through said ventilating passages; frame means mutually supporting said elements; and a dome-shaped shielding wall of larger diameter than said louver elements and means supporting it in spaced overlying relation above said upper element.

4. A device according to claim 3 in which the dome-shaped shielding wall has a heat-reflective upper surface and a heat-absorptive lower surface.

5. A device according to claim 3 in which said upper element comprises an inner vertical cylindrical section extending downwardly from said shielding wall and an outer skirt section extending outwardly and downwardly from the lower end of said vertical section.

6. A device according to claim 3 in which said vertical section and shielding wall have air-flow apertures therein to promote air convention inwardly through said louver-defined passages to said instrument space and upwardly from said space through said apertures.

References Cited in the file of this patent

UNITED STATES PATENTS 2,652,722   Wood _____ Sept. 22, 1953

FOREIGN PATENTS 308,625   Great Britain _____ Mar. 22, 1929